Oct. 3, 1972   P. H. DAVIES ETAL   3,696,038
PROCESS FOR PREPARING SINGLE CRYSTALLINE $Ag_3AsS_3$
AND $Ag_3, SbS_3$ AND SOLID SOLUTIONS THEREOF
Filed Sept. 14, 1970   5 Sheets-Sheet 1

INVENTORS
Philip H. Davies
Maurice V. Hobden
Kenneth F. Hulme
Oliver Jones
By Cushman Darby & Cushman
ATTORNEYS

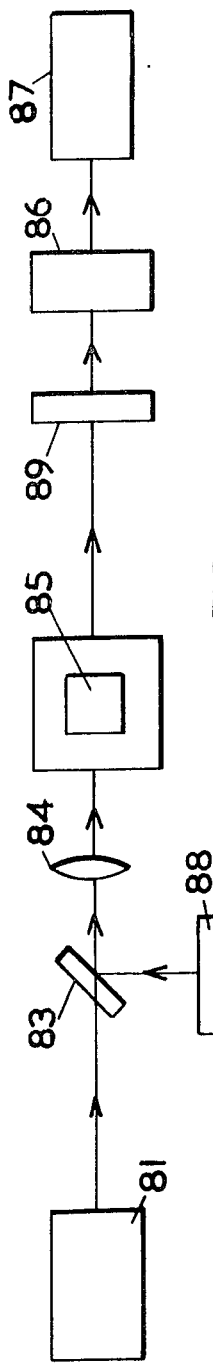
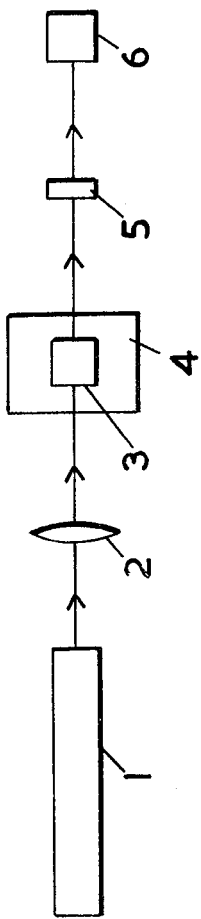
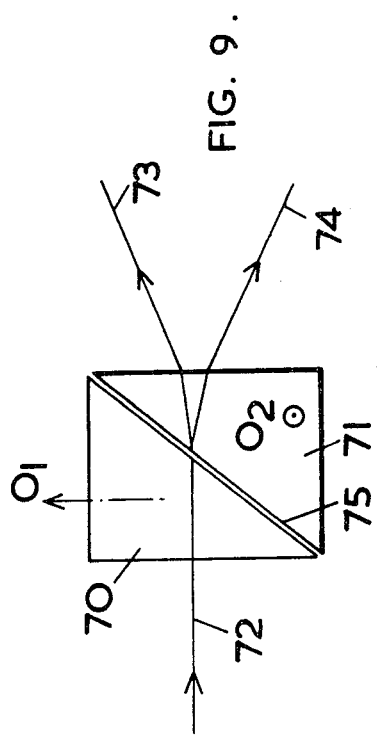

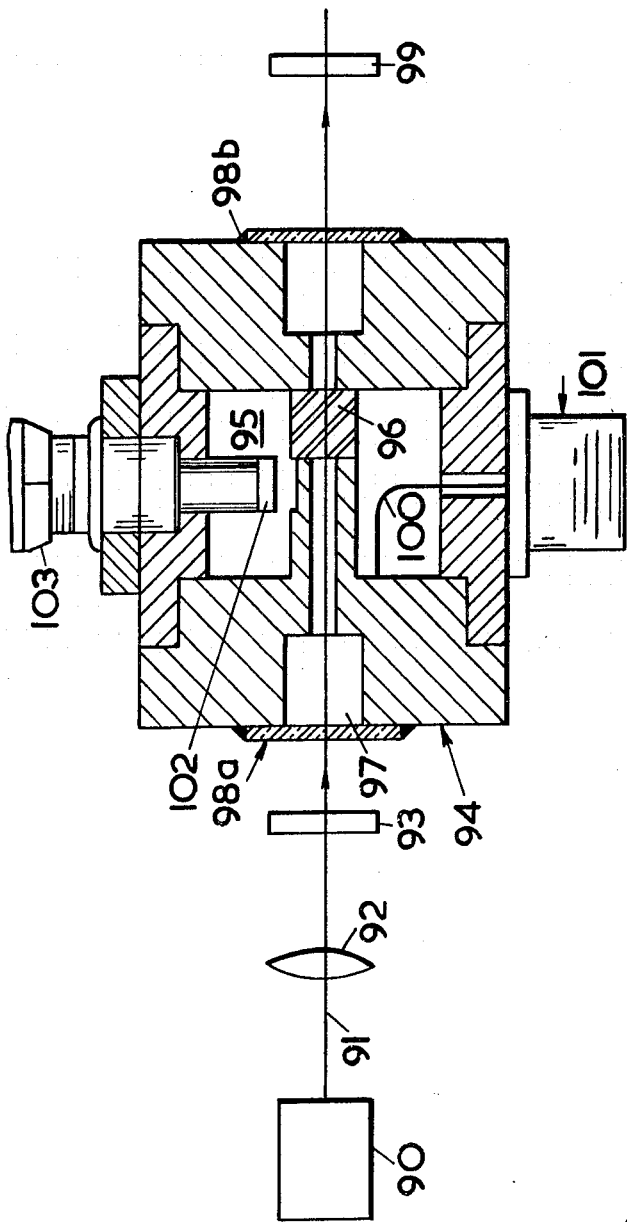

United States Patent Office 3,696,038
Patented Oct. 3, 1972

3,696,038
PROCESS FOR PREPARING SINGLE CRYSTALLINE $Ag_3AsS_3$ AND $Ag_3SbS_3$ AND SOLID SOLUTIONS THEREOF
Philip Hywel Davies, 108 Leigh Sinton Road; Maurice Vernon Hobden, 6 Cockshot Road; Kenneth Fraser Hulme, 29 Whitborn Close; and Oliver Jones, 17 Denison Close, all of Malvern, England
Continuation-in-part of application Ser. No. 689,175, Dec. 8, 1967. This application Sept. 14, 1970, Ser. No. 71,666
Claims priority, application Great Britain, Dec. 9, 1966, 55,201/66
Int. Cl. C01b 27/00, 29/00; B01j 17/20; H03f 7/00
U.S. Cl. 252—62.9                    5 Claims

ABSTRACT OF THE DISCLOSURE

The substances proustite $Ag_3AsS_3$ and pyrargyrite $Ag_3SbS_3$ and solid solutions of the two are useful non-linear materials and have applications in non-linear devices. They occur in nature but in a small and optically imperfect form. However, they may be prepared having a good optical quality and a large size by synthetic growth from the melt such as by Stockbarger growth, provided that steps are taken to alleviate the problem of cellular growth. The materials grown in such a form may be used not only in non-linear devices but also in linear devices such as polarising prisms.

---

This application is a continuation-in-part of application Ser. No. 689,175, filed Dec. 8, 1967, now abandoned.

The substances proustite $Ag_3AsS_3$ and pyrargyrite $Ag_3SbS_3$ and solid solutions of the two exist in nature as minerals but are only found with a small size and an optically imperfect form. In other words, the crystals found have dimensions of the order of 5 mm. or less and all the usual faults associated with natural crystals such as dislocations, point defects, stacking faults, macroscopic faults such as cracks and impurity colourations. The result is that these natural crystals are not usable as optical materials where optical quality is required.

Many of the properties of $Ag_3AsS_3$, $Ag_3SbS_3$ and solid solutions of the two are known; some of them have been known for a considerable time. They have been assigned to the space group R3c. They are non-centrosymmetric uniaxial crystals with a large refractive index and negative birefringence. The phase diagrams are known. Our interest in these materials began when we were searching for new materials particularly for use in the field of non-linear optics.

Since the discovery of the laser much interest has been shown in the field of non-linear optics. The central component of a non-linear optical device is a non-linear optical mixing material. Such a material has the property at high applied electric field strengths that an electric polarisation may be produced therein which is not a linear function of the electric field strength. The high electric field strengths are obtained with the laser beam acting in the non-linear optical material. The consequence is that such material may be used in a family of devices all of which operate on the same principle, namely that their effect is produced by a high applied electric field strength in a non-linear medium. The family of non-linear devices includes sum and difference frequency mixing, parametric amplification and oscillation, up-conversion and electro-optic modulation. The basic requirements for non-linear material for all of these devices are (comparatively) large non-linearity, favourable linear properties such as refractive index, stability to high power laser beams, the ability to transmit radiation in the spectral regions of the constituent wavelengths of the non-linear process and the possibility of relatively easy growth in a strain free single crystal form of reasonable size. It is a disadvantage of prior art materials that they do not meet one or more of these requirements in a satisfactory way.

In our attempts to synthesize the materials $Ag_3AsS_3$, $Ag_3SbS_3$ and solid solutions of the two from the melt in a form having a good size and optical quality, in order to investigate the interesting properties we suspected these materials might have, we came across some quite severe problems. The material which we made was opaque and polycrystalline and we discovered later (as described below) that it suffered from a growth in a cellular structure.

It is an object of the present invention to provide material in the group consisting of $Ag_3AsS_3$, $Ag_3SbS_3$ and solid solutions of the two which is of a good optical quality and of a grain size usable in an optical device.

It is also an object of the present invention to provide an optical device in which the optical material is of a good optical quality, of a relatively large grain size and is selected from the group consisting of $Ag_3AsS_3$ and solid solutions of the two.

It is also an object of the present invention to provide material in the group consisting of $Ag_3AsS_3$, $Ag_3SbS_3$ and solid solutions of the two by growth from the melt including the step of alleviating the problem of cellular growth.

It is also an object of the present invention to provide an optical non-linear device having as its non-linear medium material selected from the group consisting of $Ag_3AsS_3$, $Ag_3SbS_3$ and solid solutions of the two.

According to one aspect of the present invention there is provided a synthetic cell-free optical material consisting of a member selected from the group of materials consisting of $Ag_3AsS_3$, $Ag_3SbS_3$ and solid solutions of $Ag_3AsS_3$ and $Ag_3SbS_3$, wherein said material is transparent in the infrared and visible parts of the spectrum and grown by melt growth in which a high temperature gradient is combined with a low growth rate.

According to another aspect of the present invention there is provided a non-linear optical device wherein a non-linear medium presents to radiation incident thereon a non-linear effect, wherein said non-linear medium consists of cell-free synthetic optical material consisting of a member selected from the group of materials consisting of $Ag_3AsS_3$, $Ag_3SbS_3$ and solid solutions of $Ag_3AsS_3$ and $Ag_3SbS_3$ having transparency in the infrared and visible parts of the spectrum.

Embodiments of the invention will be described by way of example with reference to the accompanying drawings in which.

Figures 4A, 4B:

FIGS. 4(a) and 4(b) are respectively photographs of the conoscopic figures obtained at the centre and edge of proustite grown by the Stockbarger method.

FIG. 5 is a plan view of an optical second harmonic generator.

Figure 6:
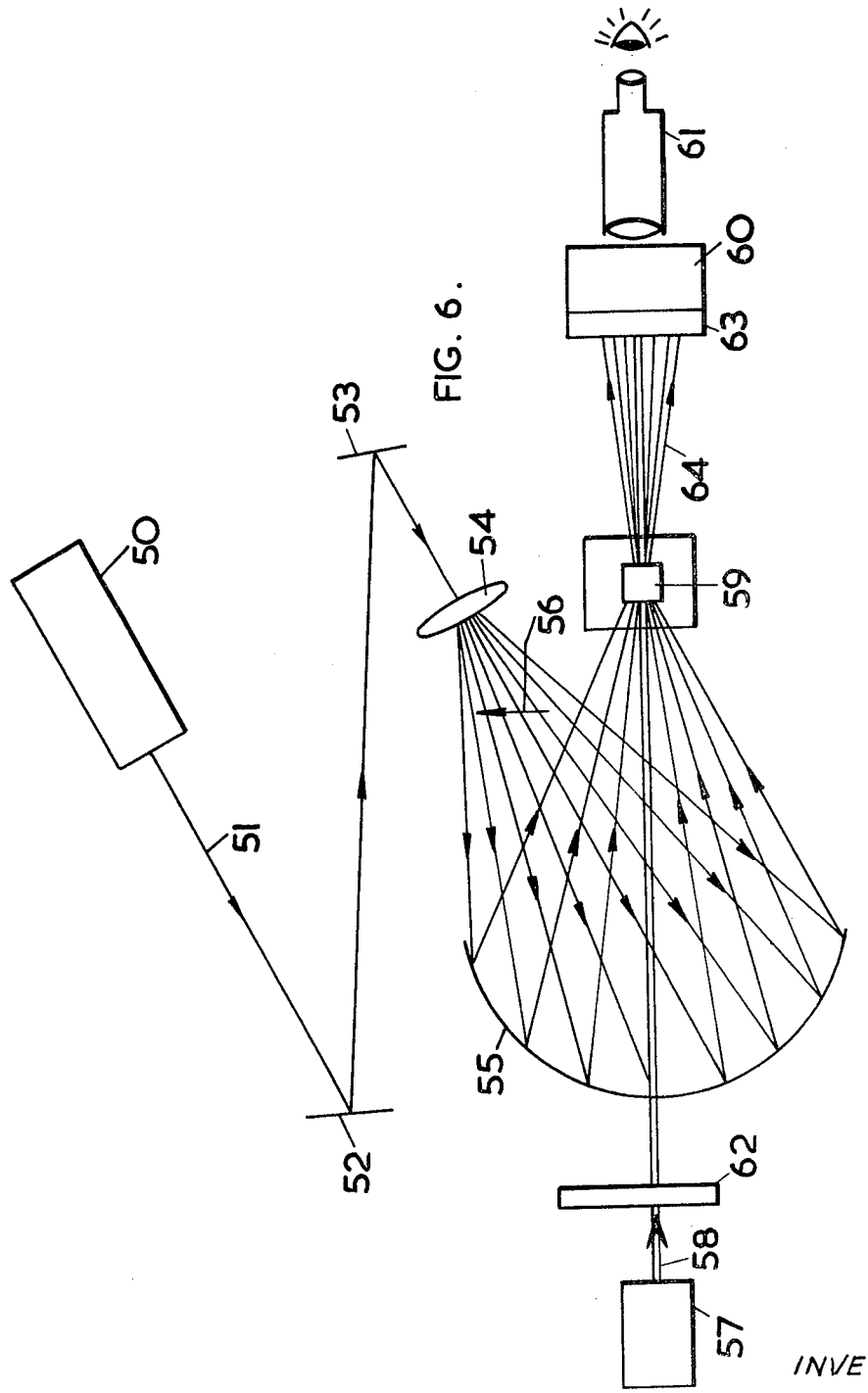

FIG. 6 is a plan view of an infrared up-converter.

FIG. 7 is a plan view of a parametric amplifier.

FIG. 8 is a cross-sectional diagram of an electro-optic modulator.

FIG. 9 is a cross-sectional diagram of a Wollaston prism.

Several previous attempts have been made by others to synthesize $Ag_3AsS_3$, $Ag_3SbS_3$ or solid solutions of them but they have all resulted in either opaque polycrystalline material or tiny transparent crystals both of which are not in general usable as optical material. For example, crystallisation from aqueous solution (Mellor J. W. in "A Comprehensive Treatise on Inorganic and Theoretical Chemistry," vol. 9, 293, published in 1947 by Longmans, Green and Co.), by growth from the melt (Wernick, J. H. and Benson K. E. in Anal. Chem., vol. 30, 303 (1958)) and by hydrothermal growth (Chang L. L. in Americ. Mineral, vol. 48, 429 (1963)) have been performed, but transparent crystals have never been reported having dimensions greater than 1 millimetre.

In our initial experiments we melted together stoichiometric proportions of high purity silver sulphide and arsenic trisulphide (to make $Ag_3AsS_3$) in sealed quartz tubes and solidified the melts by the "normal freeze" method at rates from 5 mm. per hour to 200 mm. per hour. These experiments yielded opaque products. We then investigated the problem of why the material obtained was opaque.

Experiments on varying the stoichiometric composition for these growth rates offered no improvement. Zone refining at various rates in the range 5 mm. per hour to 25 mm. per hour for up to 30 passes, taking care to avoid loss of volatile constituents, yielded translucent material of large grain size but which contained numerous inclusions throughout. We proceeded by making the ingots the subject of a careful microscopic examination and found that a cellular structure existed. After consideration, we postulated that this structure was due to the known phenomenon of "constitutional supercooling." Later results (see below) confirmed this belief.

By taking steps, which are discussed below, to produce the materials in a cell-free form, i.e. free of the cellular structure, we were able to show that the materials we had synthesised had some interesting properties.

The material proustite was found to transmit radiation from about 0.61 $\mu$m. in the visible region to 13 $\mu$m. Because the material was of such a quality and grain size that quality prisms could be cut therefrom, something which had never before been possible, we were able to take birefringence measurements and also confirm our belief that the material might have non-linear properties by operating a non-linear device using the material and measuring some of the relevant coefficients. The ordinary and extraordinary refractive indices of $Ag_3AsS_3$ were found to be 2.91 and 2.67 respectively (a negative birefringence of 0.24) at a wavelength of 0.75 $\mu$m., and 2.75 and 2.53 respectively (a negative birefringence of 0.22) at a wavelength of 2.50 $\mu$m. whilst the ordinary and extraordinary refractive indices of $Ag_3SbS_3$ were found to be 2.83 and 3.01 respectively (a negative birefringence of 0.18) at a wavelength of 0.75 $\mu$m. and 2.65 and 2.80 respectively (a negative birefringence of 0.15) at a wavelength of 2.50 $\mu$m.

Solid solutions of $Ag_3AsS_3$ and $AgSbS_3$ show a gradation of properties following roughly linear relationships between the limits observed for pure proustite and pure pyrargyrite. Since pure proustite was found to show the widest transmission range and the largest birefringence we tended to concentrate much of our effort towards this particular material.

Figure 1:
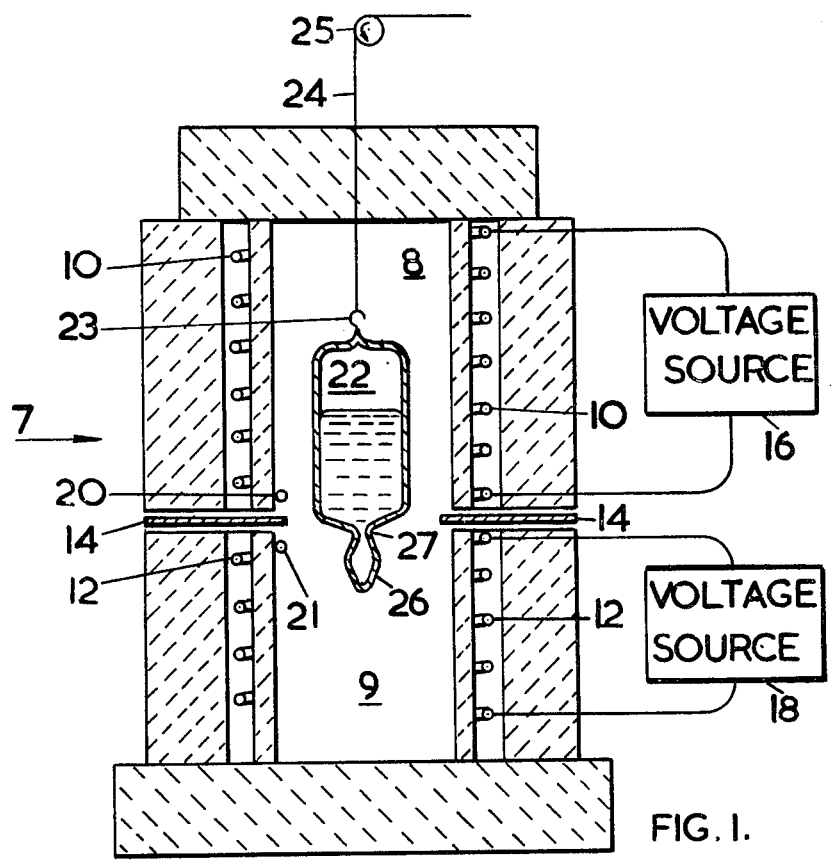
FIG. 1 is a cross-sectional diagram of apparatus for growing synthetic optical material by the Stockbarger method.

Returning now to growth of the materials reference is made to FIG. 1 which is a cross-sectional diagram of apparatus for growing synthetic optical material by the Stockbarger method. A furnace built of firebrick consists of an upper portion 8 and a lower portion 9 which are separated by heat baffles 14. Electrical heating coils 10 and 12 are located within the walls of the upper portion 8 and lower portion 9 respectively. The coil 10 is fed with energy from a conventional source 16 and the coil 12 is fed with energy from a conventional source 18. The sources 16 and 18 contain conventional means for stabilising (to an accuracy of $\pm 0.25\%$) the voltages applied to the coils 10 and 12. A thermocouple 20 is located on the wall of the upper portion 8 of the furnace 7 directly above one of the baffles 14 and a thermocouple 21 is located on the wall of the lower portion 9 directly below one of the baffles 14. A sealed vitreous silica tube 22 contains the charge of material. The tube 22 is attached at its upper end by means of a hook 23 to a cord 24 which passes over a pulley 25. The tube may thus be lowered slowly through the furnace 7. The lower end of the tube 22 is in the form of a bulb 26 which is about 25 mm. long and has a neck 27 of about 3 mm. internal diameter.

Single crystals of optical quality may be grown in the apparatus by the following process. The tube 22, at first removed from the furnace and having an open neck is taken and stoichiometric proportions of the desired starting materials are placed therein. It is possible, for example, to use the constituent elements as starting materials but it is often convenient to start from the sulphides. For example, if it is desired to grow $Ag_3AsS_3$ the sulphides $As_2S_3$ and $Ag_2S$ are taken to provide the reaction:

Therefore, the weights used need to be in the mol. proportions of 25% $As_2S_3$ and 75% $Ag_2S$. If it is desired to grow $Ag_3SbS_3$ the sulphides are $Sb_2S_3$ and $Ag_2S$ and the weights are in the mol. fractions of 25% and 75% respectively. If, for example, it is desired to grow a solid solution of $Ag_3AsS_3$ and $Ag_3SbS_3$ having molecular proportions of 30% $Ag_3AsS_3$ and 70% $Ag_3SbS_3$ the desired reaction is:

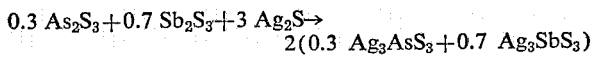

In other words the mol. fraction starting weight of $As_2S_3$ would be $0.3 \times 25\%$ i.e. 7.5% and the mol. fraction starting weight of $Sb_2S_3$ would be $0.7 \times 25\%$ i.e. 17.5% (that of $Ag_2S$ would again be 75%).

Likewise, if the desired result is, for example, 60% $Ag_2AsS_3$ and 40% $Ag_2SbS_3$ then the mol. fraction starting weights are 15.0% and 10% respectively. In general, a composition of $x\%$ $Ag_3AsS_3$ and $y\%$ $Ag_3AsS_3$ requires starting proportions of $0.25x\%$ and $0.25y\%$ respectively.

It is desirable to use starting materials of the highest purity i.e. with a maximum impurity level of about 500 parts by weight per million. (We purchase our starting materials from British Drug Houses Limited, of Poole, Dorset, England.) The tube 22 is then evacuated, flushed with argon and finally sealed under a pressure of about 0.6 atmosphere of argon at room temperature. The temperature of the furnace 7 is adjusted by adjusting the sources 16 and 18 and by use of the thermocouples 20 and 21 so that the desired temperature gradient is maintained in the region of the baffles 14. Initially it is useful to adjust the temperature of the upper portion 8 of the furnace 7 to be about 50° C. above the melting point of the desired material and the temperature of the lower portion 9 to be about 50° C. below the melting point. In the case of $Ag_3AsS_3$ (melting point 480° C.) the respective temperatures would be 530° C. and 430° C. In the case of $Ag_3SbS_3$ (melting point 483° C.) the respective temperatures would be 533° C. and 433° C. For solid solutions of $Ag_3AsS_3$ and $Ag_3SbS_3$ the temperatures are obtained from the following table:

| Percentage of $Ag_3AsS_3$ | 0 | 20 | 40 | 60 | 80 | 100 |
|---|---|---|---|---|---|---|
| Melting point (° C.) | 480 | 477 | 473 | 473 | 477 | 483 |
| 50° C. above melting point | 530 | 527 | 523 | 523 | 527 | 533 |
| 50° C. below melting point | 430 | 427 | 423 | 423 | 427 | 433 |

Since the melting point differs little throughout the whole range it is possible to use a single pair of temperatures of about 530° C. for the upper portion 8 and 430° C. for the lower portion 9 for solid solutions throughout the whole range. In any event the furnace 7 needs to be such that the temperature gradient in the region between the upper portion 8 and the lower portion 9 is not less than 6° C. per mm.

The tube 22 is fitted in position in the furnace 7 and is lowered to freeze the material in the bulb 26. As the material readily supercools, however, it is usually necessary to melt back any solid formed in the neck 27 of the bulb 26 by raising the tube 22 so that only about 8 mm. length of solid exists from the bottom of the bulb 26. A single crystal free from cellular structure is then grown by slowly lowering the tube 22 between the baffles 14 at a rate of about 8 mm. per day or less (for either $Ag_3AsS_3$, $Ag_3SbS_3$ or solid solutions of them).

Figure 2:
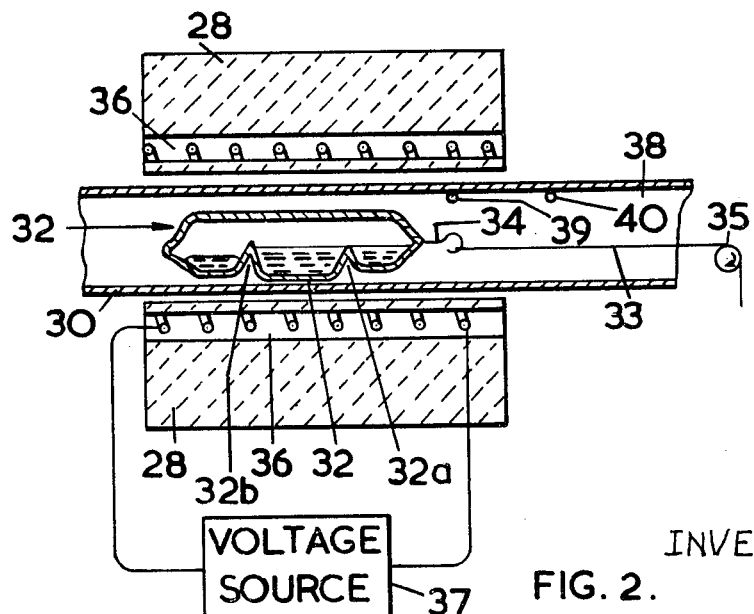
FIG. 2 is a cross-sectional diagram of apparatus for growing synthetic optical material by the horizontal Bridgman method.

FIG. 2 is a schematic cross-sectional diagram of apparatus for growing synthetic optical material by the horizontal Bridgman method. A single furnace 28 built of firebrick contains a ceramic or metal tube 30 through which a silica tube 32 containing the material can move under the action of a force (not shown) applied to a cord 33 passing over a pulley 35 and attached to a hook 34 on one end of the tube 32. A heating coil 36 fed with energy by a conventional source 37 (which again includes means for stabilising its output voltage) is located in the wall of the furnace 28.

The tube 30 contains a region 38 which is not surrounded by the furnace 28. Thermocouples 39 and 40 are contained at the wall of the tube 30 in the region of the furnace 28 and in the region 38 respectively. The size of the furnace 28 and the voltage applied to the coil 36 are chosen so that the temperature gradient along the tube 30 between the region 38 and the region inside the furnace 28 is not below 6° C. per mm. The silica tube 32 is originally open and separate from the apparatus. The tube 32 contains two constricted regions 32a and 32b to provide three compartments. During growth the volatile components of the melt can condense on the cool walls of the tube 32 above the melt as it leaves the furnace 28. By providing a reservoir of molten charge at the end of the tube 32 in the compartment behind the region 32b it is possible to preserve melt stoichiometry. The compartment nearest the region 38 of the tube 30 is that which contains the initially frozen material and the centre compartment contains the bulk of the melt. The starting materials, including those to be used in the end reservoir, are chosen as before and placed in the tube 32. The tube 32 is then evacuated flushed and sealed under 0.6 atmosphere of argon at room temperature and fitted inside the ceramic or metal tube 30. The material in the first compartment of the tube 32 is again first frozen as before and then the tube 41 is moved towards the pulley 35 at a speed of 8 mm. per day and a single crystal of optical quality is grown. The furnaces 7 and 28 of the above methods may alternatively be of silica.

In addition to the two methods described above we have also grown several crystals in a resistance-heated Czochralski crystal puller of generally conventional design. The silica tube containing the charge was 40 mm. in diameter and 200 mm. long. The initial charge was in the stoichiometric proportions detailed above and was melted in the silica tube under a pressure of 1 atmosphere of argon. There is a continual distillation of volatile components which tends to reduce the quality of the product but nevertheless using a stirring rate of 30 r.p.m. and growth rates and temperature gradients similar to those used for the Stockbarger and horizontal Bridgman techniques we have found that it is possible to grow single crystals free of cellular growth but with a slightly smaller size.

We prefer to use the Stockbarger method of growth because the loss of volatile components is confined to a small dead space above the melt and convective temperature fluctuations in the melt are minimised.

We have grown crystals up to 3 cm. in diameter and 10 cm. in length having no cellular growth. Most of these have grown randomly with 30° of the optic axis; this facilitates cutting of optical specimens. By replacing the bulb 26 in the apparatus of FIG. 1 or the end compartment for solid in the apparatus of FIG. 2 by an extension to hold a seed consisting of an orientated single crystal then crystals of a particular orientation may be grown.

Figure 3:
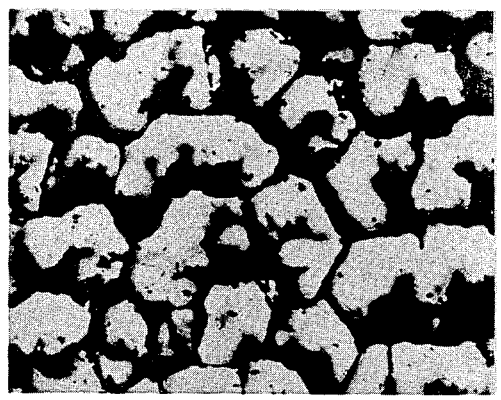
FIG. 3 is a photo micrograph of the cellular structure which is obtained if steps are not taken to avoid cellular growth during growth from the melt.

FIG. 3 is a photo micrograph with a magnification of about 80 of a polished slice of proustite taken normal to the growth axis and shows the typical cellular structure which is obtained if the conditions for growing optical quality material are not fulfilled. We have determined experimentally that with a growth speed of 8 mm. per day and a temperature gradient of 60° C. per mm. cellular growth occurs when the concentration in the melt of $xAs_2S_3 + (1-x)Sb_2S_3$, $0 \leqslant x \leqslant 1$, falls outside the approximate limits of 22 to 28 mol percent. At a growth rate of 4 mm. per day and the same temperature gradient the limits widen to about 18 to 32 mol percent. The conclusion is that departure from exact stoichiometry tends to be the factor which leads to segregation of the major components giving rise to the cellular structure and it is overcome by raising temperature gradients and lowering growth rates. (We did not realise this during our original experiments because the limits imposed on the stoichiometry by the rather low temperature gradient were quite stringent.) We have used growth speeds up to 112 mm./day without marked deterioration in the product. The melts were stoichiometric and the temperature gradient about 6° C./mm. Likewise it is possible by reducing the growth speed to a very low rate to use temperature gradients less than 5° C. per mm. It is a matter of mere experimentation to find where the actual limits for the onset of cellular growth occur for each particular case but it is obviously best to use a combination of a temperature gradient greater than 5° C. per mm. and a growth rate of 8 mm. per day or less. Our conclusion that the departure from exact stoichiometry and how to overcome it is the major feature is different from that inferred from the results of previous workers, which is that the purity of the starting materials is the mjaor problem. Our experiments show that the purity of the starting materials is important but not the limiting problem. (This distinction is so because the segregation causing cellular growth is determined by non-stoichiometry rather than by actual impurities.)

A good guide to the optical quality is to examine the transmission coefficient of the material, to test the material in devices (as described below). Our results show that the transmission coefficient of radiation in the band 0.6 to 13 microns has been found to be very high for polished specimens. The samples have been used successfully in several devices. A further test is to produce the "conoscopic figures" which are well known to those in the art of crystal optics and which are produced with the use of a polarising microscope as described for example in "An Introduction to Crystal Optics" by P. Gay (Longmans, 1967). The effect is to produce a diffraction pattern between crossed polarisers. FIGS. 4(a) and 4(b) are the photographs of conoscopic figures obtained at the centre and edge respectively of a typical cut and polished slice of proustite. The result for a perfect sample is a Maltese cross on a pattern of concentric circles. It can be seen that FIG. 4a is quite close to perfection. A small amount of distortion is present in the conoscopic figure in FIG. 4b, however, due to a small amount of elastic strain arising from imperfections in the microstructure at the edge of the crystal. This strained region can be removed by careful cutting or grinding. The effect of many defects in the crystal would be a net strain yielding a large distortion in the conoscopic figure and this is clearly absent.

FIG. 5 is a plan view of an optical second harmonic generator. It serves to illustrate use of the non-linear properties of the materials.

A high pulse recurrence frequency pulsed helium-neon gas laser 1 emits infra-red radiation with a detailed line structure; one of the lines has a wavelength of 1.152 microns. Radiation from the laser is lightly focussed by an optical system 2 on a crystal 3 grown as described above and consisting of a plate of $Ag_3AsS_3$, $Ag_3SbS_3$ or a solid solution of the two held in an oven 4. The crystal 3 is cut so that its optic axis is parallel to the surface of the plate (which are perpendicular to the optic axis of the laser 1). On emerging from the plate 3 the radiation passes through a filter 5 to a photomultiplier detector 6. The filter 5 absorbs infra-red radiation but transmits visible radiation.

The action is as follows. A portion of the radiation from the laser 1 is doubled in frequency in the crystal 3 to form the second harmonic and this portion can be detected most efficiently when the phase velocities of the fundamental and the second harmonic are equal. This is possible only if the material has two refractive indices, say $a(\omega)$ and $b(\omega)$, where $\omega/2\pi$ is the radiation frequency, and $$a(\omega_0) = b(2\omega_0)$$

where $\omega_0/2\pi$ is the fundamental frequency and $\omega_0/\pi$ is the second harmonic frequency. For example, such a relationship occurs between the ordinary and the extraordinary refractive indices of proustite along the direction perpendicular to the optic axis, at a temperature in the region of 12° C. for a wavelength of 1.152 microns. The fundamental is the ordinary wave and the second harmonic is the extraordinary wave.

The second harmonic radiation, which has a wavelength of 0.576 micron, is passed through the filter 5 since it is in the visible spectrum, and is detected by the photomultiplier 6. On the other hand fundamental radiation from the laser 1 is stopped by the filter 5.

It is recognised that the above arangement suffers from the low transmission of the crystal 3 at 0.567 micron, which is near the limit of the transmission range of the materials; however, it does illustrate generation of the second harmonic of infra-red radiation.

By the above arrangement we were able to measure some of the non-linear coefficients. We found that the coefficient $$|d_{31}^P| = 30|d_{36}^{KDP}| \text{ and } |d_{22}^P| = 50|d_{36}^{KDP}|$$

where P represents proustite and KDP potassium dihydrogen phosphate.

FIG. 6 is a plan view of an infrared up-converter. It illustrates another example of the non-linear properties of $Ag_3AsS_3$, $Ag_3SbS_3$ or solid solutions of the two. A carbon dioxide laser 50 (wavelength $10.6\mu$) provides an infrared laser beam 51 which is reflected by a mirror 52 towards a mirror 53 and by the mirror 53 to a diffuser 54 consisting of a plate of frosted glass coated in KBr. Radiation from the diffuser 54 is scattered and most of it is incident on a concave mirror 55. An object 56 is placed between the mirror 55 and the diffuser 54 and the intensity of radiation incident on the mirror 55 is modulated by the presence of the object 56. A high power ruby laser 57 produces a laser beam 58 (of a wavelength 0.6943 micron) which is incident on a crystal 59 of $Ag_3AsS_3$, $Ag_3SbS_3$ or a solid solution of the two grown as described above. The infrared radiation from the diffuser 54 and object 56 are focussed by the mirror 55 also on the crystal 59. The beam leaving the crystal 59 is passed through a dielectric filter 60 which passes only a narrow band of radiation at the wavelength corresponding to the sum frequency ($0.65\mu$) but which absorbs radiation at the wavelength of the ruby laser 57. The filtered radiation is then observed through a telescope 61. A polariser 62 polarises the ruby laser radiation incident on the crystal 59 and an analyser 63 which is crossed therewith helps to filter any unwanted ruby radiation leaving the crystal 59. The effect of the crystal 59 is to mix and add the beam 58 with the intensity modulated infrared radiation from the mirror 55. The modulation is transferred to a resultant beam 64 of the sum frequency. The telescope 61 is necessary to view the resultant beam because the image of the object 56 becomes diminished during the mixing process. The angular positioning of the crystal 59 is adjusted until the maximum phase matching between the mixed beams occurs and the most distinct image is obtained.

FIG. 7 is a plan view of another non-linear device, a parametric amplifier. A neodymium-YAG laser 80 of wavelength 1.06 $\mu$m. ($\omega_p$) is used as a pump source. The laser 80 is repetitively Q-switched. A carbon dioxide laser 81 provides a signal source of wavelength 10.6 $\mu$m. ($\omega_s$). The laser 80 provides a beam which is arranged by means of a mirror 82 and a semitransmitting mirror 83 to be colinear with the output beam of the laser 81. The laser beams from the lasers 80 and 81 are lightly focussed by a lens 84 having a focal length of about 10 cm. on a nonlinear crystal 85 consisting of $Ag_3AsS_3$, $Ag_3SbS_3$ or a solid solution of the two prepared as described above. The resultant radiation is passed through a dielectric filter 86 passing $\omega_s$, but not $\omega_p$, and is detected by a photomultiplier 87. A polariser 88 is inserted in the path of radiation from the laser 80 and an analyser 89 is inserted in the path of radiation leaving the crystal 85.

Operation is as follows. Within the crystal 85 a mutual coupling occurs of 3 waves of frequencies $\omega_p$, $\omega_s$ and $\omega_p - \omega_s$. The energy flow between the waves is governed by the Manley-Rowe relations for the number N of photons at a given frequency $\omega$, which are:

$$N(\omega_p) + N(\omega_p - \omega_s) = \text{constant}$$

$$N(\omega_p) + N(\omega_s) = \text{constant}$$

In other words one photon at the pump frequency is "split" to give rise to two photons one at $\omega_s$ and one at $\omega_p - \omega_s$. The effect therefore of the pump signal is to produce amplification of the signal at $s$. The noise temperature is very high, so it is convenient to cool the filter-detector system to liquid helium temperatures. The polariser 88 is crossed with the analyser 89 so that unwanted pump radiation is more effectively removed. Amplifications of the carbon dioxide laser beam up to 3 db can be expected.

Several other effects may be demonstrated by simple modifications to the apparatus. The crystal 86 may be coated with conventional dielectric reflecting films, such as those used for laser rods, to form a resonator. The apparatus is then converted into a parametric oscillator for pump powers above a threshold of about 2 watt. By inserting the crystal 85 in an oven, the frequency of the parametric oscillator may be temperature tuned over a wide band of frequencies in the 1–10 $\mu$m. region by varying the temperature of the oven.

By inserting a prism after the crystal 85 and replacing the analyzer 89, filter 86 and photomultiplier 87 by a spectrum analyser the radiation leaving the crystal 85 consisting of $\omega_p$, $\omega_s$ and $\omega_p - \omega_s$ may be split into its components by refraction and detected separately. The signal obtained at $\omega_p - \omega_s$ then is provided as the result of the non-linear process of difference frequency generation which occurs simultaneously with the parametric effect. Alternatively the radiation at $\omega_p - \omega_s$ may be filtered and used.

Another modification is to generate the second harmonic of radiation from the pump laser 80 by the method described above before it is mixed with the radiation from the laser 81. This extends the versatility of the apparatus.

Although the materials $Ag_3AsS_3$, $Ag_3SbS_3$ and solid solutions of the two are of most interest when used in second harmonic generation, up-conversion and parametric devices they may be used in any other non-linear device. FIG. 8 is a cross-sectional diagram of a tunable electro-optical modulator. A Helium/Neon laser 90 produces a beam 91 of wavelength 0.63 $\mu$m. The beam 91 is focussed by a lens 92 and passed through a quarter wave plate 93 to a modular 94. The modulator 94 consists of a microwave resonant cavity 95 containing a crystal 96 of proustite prepared as described above located between its walls. The cavity 95 of the device 94 is in the shape shown because it facilitates a relatively small crystal to be used in an axial electric field. The modulator 94 contains a hollow portion 97 for the beam 91 to pass through. Protective glass flats 98a and 98b are located at the ends of the hollow portion 97. The beam 91 leaving the modulator 94 is passed through an analyser 99. A microwave input to the cavity is formed by a loop 100 forming a matched termination to a coaxial line 101. A variable capacitor is formed in the cavity 95 by means of a dielectric layer 102 located on the end of a micrometer-driven plunger 103 permitting tuning of about ±5% about the centre frequency of the microwave radiation. The crystal 96 is located with its C axis parallel to the direction of the beam 91 to reduce the effects of natural birefringence. The end faces (perpendicular to the beam 91) of the crystal 96 are made parallel within 0.1 m.rad and polished flat to within one half wavelength of the beam 91. The system provided by the quarter wave plate 93 and the analyser 99 ensures operation in the fundamental mode by polarising and analysing the beam 91 in one plane of polarisation. The output beam 91 from the modulator 94 is a light beam which is intensity modulated by mixing in the crystal 96 with the microwave signal. Such an output may be used for information processing, wide-band communication and subcarrier-modulated optical radar systems.

The wavelength 0.63 $\mu$m. of the He/Ne laser is quite close to the transmission cut-off of proustite. If it is desired to use pyrargyrite or a solid solution of the two this can be done using another gas laser of longer wavelength.

Because it has a large transmission coefficient throughout much of the visible and infrared parts of the optical region of the spectrum $Ag_3As_xSb_{1-x}S_3$ ($0 \leq x \leq 1$) grown in accordance with the invention may be used in simple optical components such as lenses and prisms. Because it has also a large birefringence it can also be used for a range of components similar to those of other transparent birefringent materials such as calcite crystals.

For example, one use is a Wollaston prism and this is illustrated in FIG. 9. A triangular prism 70 is cemented to a triangular prism 71. The prisms 70, 71 are both of proustite, pyrargyrite or a solid solution of the two grown in accordance with the invention. The cementing is made with conventional material 75 for sealing Wollaston prism components such as glycerine or castor oil. The prism 70 is cut so that its optic axis O, is in the vertical direction as shown and the prism 71 is cut so that its optic axis $O_2$ is perpendicular to $O_1$ and to the direction of incident light 72. The effect is that the light 72 is plane polarised and forms an ordinary beam 73 which is separated from an extraordinary beam 74 and both are deviated.

We claim:
1. A process for producing a synthetic optical material consisting of a single crystal of a material selected from the group consisting of $Ag_3AsS_3$, $Ag_3SbS_3$ and a solid solution of $Ag_3As_xSb_{1-x}S_3$ ($1 \geq x \geq 0$), said crystal being optically transparent in substantially the wavelength range 0.6 $\mu$m. to 13 $\mu$m., said crystal of $Ag_3AsS_3$ having an ordinary refractive index and an extraordinary refractive index of 2.91 and 2.67, respectively, at a wavelength of 0.75 $\mu$m. and an ordinary refractive index and an extraordinary refractive index of 2.75 and 2.53, respectively at a wavelength of 2.50 $\mu$m., said crystal of $Ag_3SbS_3$ having an ordinary refractive index and an extraordinary refractive index of 2.83 and 3.01, respectively, at a wavelength of 0.75 $\mu$m. and an ordinary refractive index and an extraordinary refractive index of 2.65 and 2.80, respectively, at a wavelength of 2.50 $\mu$m., and said crystal of said solid solution having an ordinary refractive index and an extraordinary refractive index at a wavelength of 0.75 $\mu$m. and at a wavelength of 2.50 $\mu$m. following a substantially linear relationship between the above limits for said $Ag_3AsS_3$ and $Ag_3SbS_3$, the steps comprising confining in an inert atmosphere a source material consisting essentially of silver, in elemental or sulfide form with a member selected from the group consisting of antimony and arenic, in elemental or sulfide form with the proviso that sufficient silver, antimony, arsenic and sulfur values be present in substantially stoichiometric amounts to produce said $Ag_3AsS_3$, $Ag_3SbS_3$ or said solid solution, introducing said confined source material into crystal producing means comprising a first zone having a temperature about 50° C. above the melting point of the resulting crystal and a second zone having a temperature of about 50° C. below the melting point of the resulting crystal with a temperature gradient between said first and second zone being not less than 5° C. per mm. and moving said confined source material from the inlet of said first zone to the outlet of said second zone at a rate of at most about 8 mm. per day, thereby producing said crystal.

2. The process of claim 1 wherein the temperature gradient is not less than 6° C. per mm.

3. The process of claim 1 wherein said mixture consists essentially of $As_2S_3$ and $Ag_2S$.

4. The process of claim 1 wherein said mixture consists essentially of $Sb_2S_3$ and $Ag_2S$.

5. The process of claim 1 wherein said mixture consists essentially of $As_2S_3$, $Sb_2S_3$ and $Ag_2S$.

References Cited

UNITED STATES PATENTS 2,882,192    4/1959    Wermick.

OTHER REFERENCES

Butsko: "Chemical Abstracts," vol. 61, p. 10290d (1964).

Jaeger et al., Anorg. Chem., vol. 78, pp. 245–268 (1912).

JAMES E. POER, Primary Examiner

J. COOPER, Assistant Examiner

U.S. Cl. X.R.

23—136, 301 SP; 252—300; 330—4.5